United States Patent
Banton et al.

(10) Patent No.: US 7,271,380 B2
(45) Date of Patent: Sep. 18, 2007

(54) COLOR INPUT SCANNER CALIBRATION SYSTEM

(75) Inventors: Martin E. Banton, Fairport, NY (US); Paul A. Hosier, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 50 days.

(21) Appl. No.: 11/301,613

(22) Filed: Dec. 13, 2005

(65) Prior Publication Data

US 2007/0131855 A1 Jun. 14, 2007

(51) Int. Cl.
*G01J 3/50* (2006.01)
*H04N 9/73* (2006.01)

(52) U.S. Cl. ............... 250/226; 250/214 C; 348/223.1

(58) Field of Classification Search ............ 250/214 C, 250/226
See application file for complete search history.

(56) References Cited

U.S. PATENT DOCUMENTS 4,679,073 A * 7/1987 Hayashi ................. 358/516
5,373,374 A 12/1994 Traino et al.
6,266,438 B1 7/2001 Metcalfe et al.
2002/0113881 A1* 8/2002 Funston et al. ............ 348/223
2005/0174610 A1* 8/2005 Fukawa ..................... 358/461
2005/0195281 A1* 9/2005 Misaka et al. ......... 348/207.99

FOREIGN PATENT DOCUMENTS

JP 01090458 A * 4/1989
JP 04318757 A * 11/1992
JP 08065458 A * 3/1996

* cited by examiner

*Primary Examiner*—Georgia Epps
*Assistant Examiner*—Christopher M Yealy
(74) *Attorney, Agent, or Firm*—R. Hutter

(57) ABSTRACT

A photosensitive apparatus, such as scanner, includes a plurality of pixels, each pixel having associated therewith a set of photosensors, each photosensor filtered to record a primary color. The photosensors are exposed to light of each primary color separately, thereby deriving test signals. A cross-color correction factor for the pixel is derived from the test signals. The cross-color correction factor is used in processing signals output from the pixel when an image is being recorded, so as to isolate the effects of signal crosstalk between closely-spaced photosensors of different colors.

13 Claims, 2 Drawing Sheets

COLOR INPUT SCANNER CALIBRATION SYSTEM

TECHNICAL FIELD

The present disclosure relates to image sensor arrays used in raster input scanners. In particular, the disclosure relates to a system for calibrating a color scanner.

BACKGROUND

Image sensor arrays typically comprise a linear array of photosensors which raster scan an image-bearing document and convert the microscopic image areas viewed by each photosensor to image signal charges. Following an integration period, the image signal charges are amplified and transferred as an analog video signal to a common output line or bus through successively actuated multiplexing transistors.

For high-performance image sensor arrays, one practical design includes an array of photosensors of a width comparable to the width of a page being scanned, to permit one-to-one imaging generally without the use of reductive optics. In order to provide such a "full-width" array, however, relatively large silicon structures must be used to define the large number of photosensors. One technique to create such a large array is to make the array out of several butted silicon chips. In one design, an array includes 20 silicon chips, butted end-to-end, each chip having 372 active photosensors spaced at 600 photosensors per inch.

In most scanning systems currently in use, the signal coming out of the photosensors during the scanning process is an analog video signal, with the voltage magnitude corresponding to the intensity of light impinging on the photosensor at a given time. The different video levels correspond to the brightness of the reflected area being scanned by a particular photosensor at a particular moment. These analog outputs are digitized and then applied, as needed, to look-up tables, such as to convert the signals to a device-independent color space for further processing.

In a scanner for recording color images, there is typically provided multiple linear arrays of photosensors. Each array includes a translucent filter, causing the particular linear array to be sensitive to substantially one primary color, such as red, blue, and green, to correspond to structures in the human eye. The signals from each filtered linear array are then recorded for assembling a full-color image. There may also be a "white," or effectively non-filtered, array. With a color input scanner, there is a need for occasional calibration of the linear array outputs relative to each other; to do this, the arrays are typically exposed to white light from a test target of known properties, and their outputs are compared and generally normalized, such as through a look-up table for signal outputs. In a calibration operation, the look-up tables are typically altered depending on current conditions, to result in a normalized output when images are recorded.

U.S. Pat. No. 6,266,438 describes a basic color calibration system for a multi-chip input scanner. U.S. Pat. No. 5,373,374 describes an input scanner in which each of a set of primary-color filters are selectably placed in front of a single-linear-array photosensitive device.

SUMMARY

According to one aspect, there is provided method of operating a photosensitive apparatus, the apparatus including a first photosensor sensitive to a first color and a second photosensor sensitive to a second color. The first photosensor and the second photosensor are exposed to light of substantially the first color, thereby deriving test signals from the first photosensor and the second photosensor. The first photosensor and the second photosensor are exposed to light of substantially the second color, thereby deriving test signals from the first photosensor and the second photosensor. A cross-color correction factor is derived from the test signals. The cross-color correction factor is used in processing signals output from the first photosensor and the second photosensor when an image is being recorded.

According to another aspect, there is provided a method of operating a photosensitive apparatus, the apparatus including a plurality of pixels, each pixel having associated therewith a first photosensor sensitive to a first color, a second photosensor sensitive to a second color, and a third photosensor sensitive to a third color. For each of a plurality of pixels, the first photosensor, the second photosensor, and the third photosensor are exposed to light of substantially the first color, thereby deriving test signals from the first photosensor, the second photosensor, and the third photosensor. The first photosensor, the second photosensor, and the third photosensor are exposed to light of substantially the second color, thereby deriving test signals from the first photosensor, the second photosensor, and the third photosensor. The first photosensor, the second photosensor, and the third photosensor are exposed to light of substantially the third color, thereby deriving test signals from the first photosensor, the second photosensor, and the third photosensor. A cross-color correction factor for the pixel is derived from the test signals. The cross-color correction factor is used in processing signals output from the pixel when an image is being recorded.

DETAILED DESCRIPTION

Figure 1:
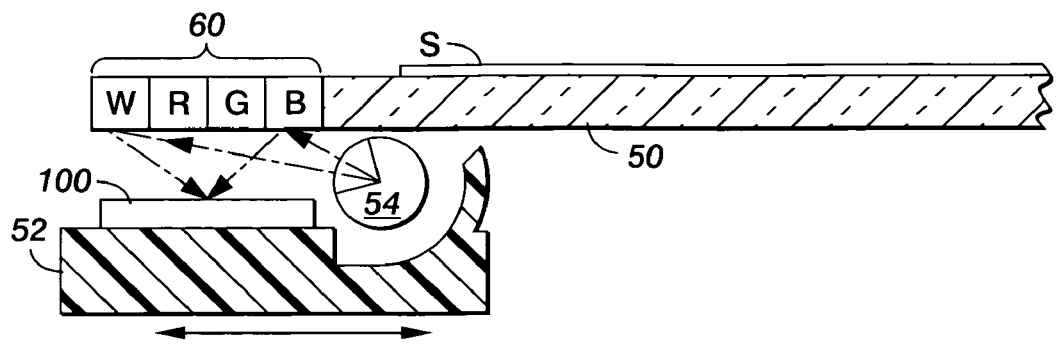
FIG. 1 is a simplified view of relevant portions of an image input scanner as would be found, for example, in a digital copier.

FIG. 1 is a simplified view of relevant portions of an image input scanner as would be found, for example, in a digital copier. There is provided a light-transmissive platen 50 on which can be supported a sheet S bearing an image to be recorded. (There may also be provided a document handler, not shown.) Movable underneath platen 50 is a carriage 52, on which is disposed a lamp 54, and a photosensitive device including at least one chip 100, which will be described in detail below. When carriage 52 is moved (by means not shown) under platen 50, lamp 52 illuminates the image on sheet S, and the light reflected from the image is recorded by photosensors on chip 100, which convert the intensities of the reflected light into image signals. At one end of platen 50, in the embodiment, is a set 60 of test areas which can be used in a calibration step for the photosensitive device, as will be explained below.

Figure 2:
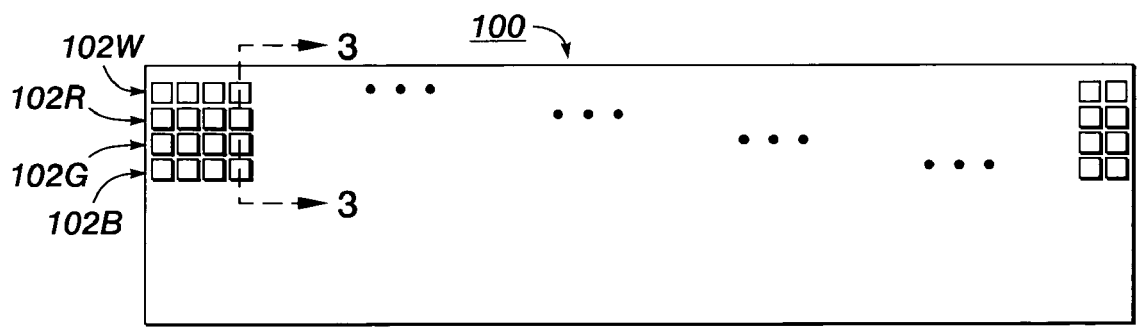
FIG. 2 is a simplified plan view of a photosensor array on chip.

FIG. 2 is a simplified view of a photosensor array on chip. Such a chip 100, or a plurality thereof, would be used in, for example, an apparatus for recording hard-copy images, such as in a digital copier or facsimile. In such an apparatus, a sheet bearing an image to be recorded is moved relative to the chip and the photosensors on the chip "see," over time, a series of pixel-sized areas on the sheet S, and output image signals for each small area. The image signals are processed and accumulated to obtain image data describing the entire recorded image.

Each chip 100, in this embodiment, includes four rows, or linear arrays, of photosensors. Each linear array has associated therewith a translucent filter (to be shown below), causing the linear array to be sensitive to one or more primary colors. The linear arrays are thus indicated as 102R (red), 102G (green), 102B (blue) and 102W (white, or unfiltered with regard to visible light). As mentioned above, every small area on an image on sheet S will be "viewed" by one photosensor of each primary color as the carriage 50 moves therepast, and the recorded signal for each color row will be used to obtain full-color image data.

Figure 3:
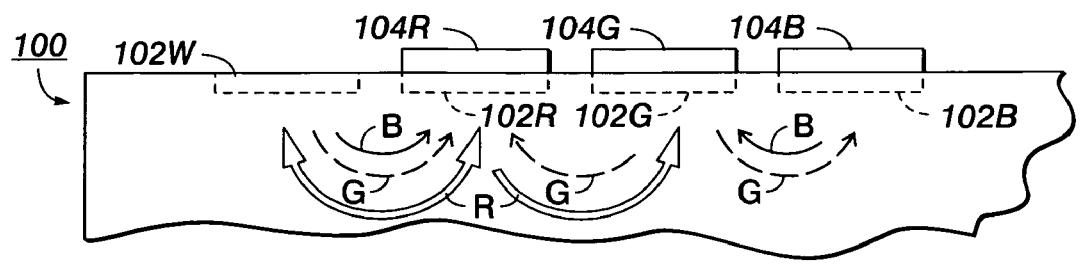
FIG. 3 is a sectional view through line 3-3 in FIG. 2, showing the behavior of charges induced in the silicon of a chip among neighboring photosensors.

FIG. 3 is a sectional view through line 3-3 in FIG. 2, showing the behavior of charges induced in the silicon of a chip 100 among neighboring photosensors, each sensitive to a different primary color, particularly when the chip 100 as a whole is exposed to white light (i.e., light including different primary-color components). A typical distance between adjacent edges of photosensors such as 102W and 102R is between 10 and 20 micrometers. Generally speaking, when light passes through a light-transmissive primary color filter, such as 104R (red), 104G (green), or 104B (blue), or through effectively a "white" filter, meaning possibly no filter, charges are induced in the silicon at some distance below the surface of the silicon, and are eventually transferred out as voltages having magnitudes related to the intensity of the light thereon. When different-color sensitive photosensors are in proximity to each other, however, there will be some crosstalk between zones within the silicon associated with each primary color. As shown by the arrows variously marked R, G, and B, charges induced in the white photosensor 102W, which of course will be caused by light across the visible spectrum, will mean that charges created by red light, blue light, and green light can migrate into the zone associated with red light in photosensor 104R; conversely some red-related charge created in photosensor 102R will migrate to the white photosensor 102W, affecting the signal supposed to be associated with white light. Similar color crosstalk, i.e., signals created by light of one color being accidentally associated with a photosensor intended to record another color, exist between the red and green photosensors, and the green and blue photosensors.

There are other sources of color crosstalk in a practical application of a color scanner or other photosensitive apparatus. The translucent filters such as 104R, 104G, and 104B associated with each primary color may not be "perfect," and may admit portions of the visible spectrum that overlap with those of other primary-color filters; this is known as "color filter tail mixing." Other sources of crosstalk include variations in the charge-generation behavior of silicon in different parts of a single chip; variations in the thickness or transmissivity of different filters 104R, 104G, and 104B across a chip or in an apparatus; variations in intensity and/or color across the illumination lamp 52; variations in color due to the aging of the lamp 52 or other parts; or contamination by material, such as dust or stray toner particles, that is not color-neutral.

To take into account this color crosstalk, and thereby enhance the overall precision and accuracy of the chip 100 in recording primary colors from an image, there is proposed a type of calibration in which photosensors of each primary-color sensitivity are calibrated with light of a particular primary color, and, based on the signals thus derived, a crosstalk correction factor, which may be of any of various types, is obtained. This crosstalk correction factor is then applied to subsequent signals from the chip when images are recorded.

Returning to FIG. 1, there can be seen, adjacent platen 50, a set 60 of calibration target areas, labeled W, R, G, B for the colors thereof. The different areas are illuminated by lamp 54 and thus cause light of predetermined characteristics to be received by chip 100. The areas in set 60 may be larger than the photosensors; the carriage 52 can move past each primary-color area in turn. The salient consideration is that, at controlled times, light of one predetermined color is directed at each set of primary-color-sensitive photosensors in chip 100. (Other apparatus having an equivalent effect, such as by using selectable LED's of various colors, can be employed. In such a case, the different-colored LED's can be used together to act as the document illuminator during scanning.) By calibrating the photosensors associated with each primary color separately, the crosstalk correction factor is calculated.

In a practical application, certain actions are taken during the design phase of a control system for handling image signals, and then other actions are taken when the apparatus as in FIG. 1 is calibrated, such as during a power-up or at other times. During the design phase, calibration scans are taken from several sensors in several different scanners and a set of coefficients (such as a 3×3 color correction matrix or other correction equations or tables) is calculated to minimize the average color error for all scanners. When the apparatus is in operation, for each "pixel" (set of adjacent color photosensors such as shown in FIG. 3, which would be looking at the same small area of an image being recorded), the amount of cross-color response and primary response is determined during primary-color calibration image captures. The primary and cross-color response components of each set of adjacent color photosensors are compared to the response components determined during the design phase. This difference is used either to adjust a full color correction formula such as a 3×3 matrix, or to adjust the single color output before correction.

Figure 4:
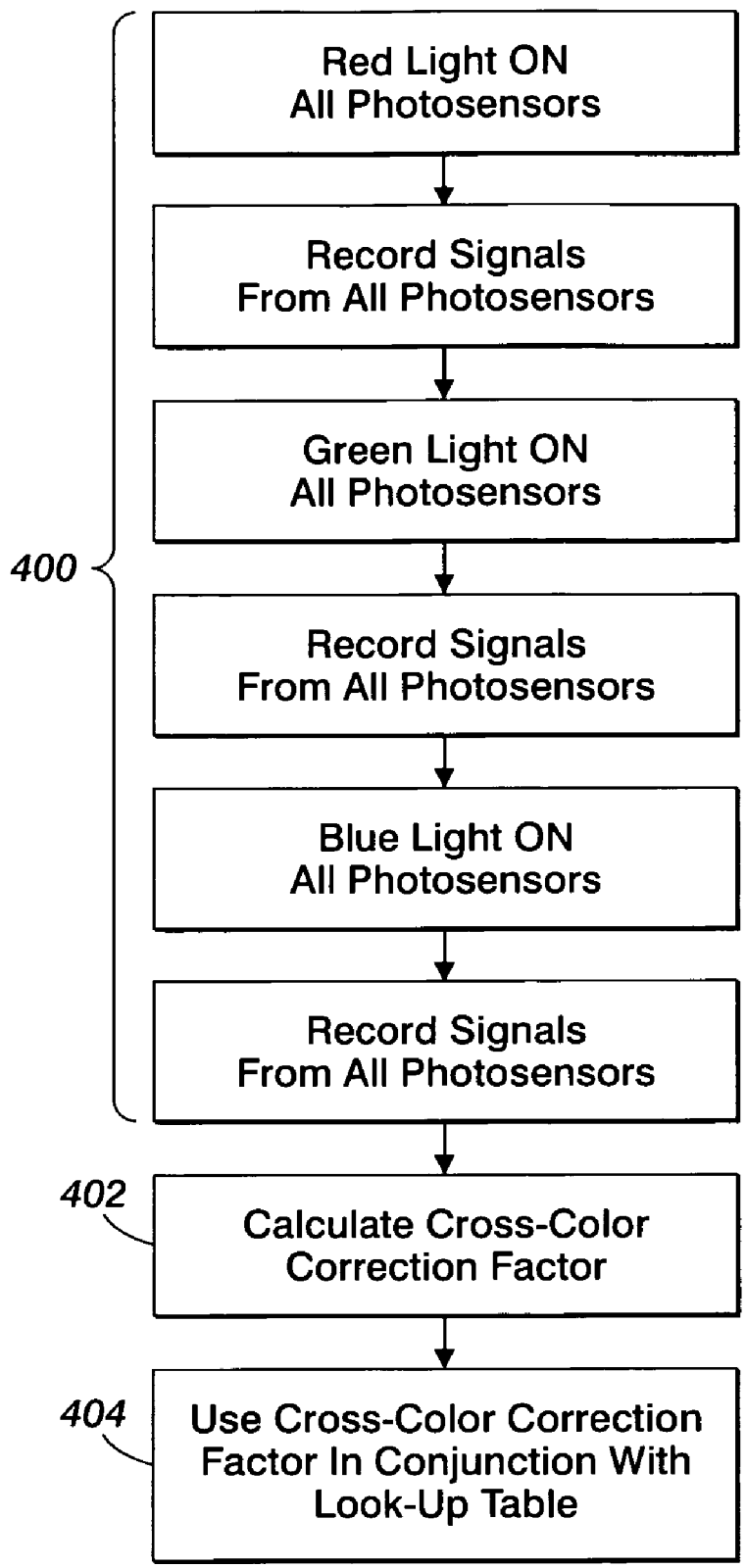
FIG. 4 is a flowchart showing the operation of a scanner, such as in FIG. 1, during calibration.

FIG. 4 is a flowchart showing the operation of a scanner, such as in FIG. 1, during calibration. In overview, during a calibration process, the carriage 52 (as shown in FIG. 1) is moved relative to the set 60 of color calibration test targets. Lamp 54 illuminates, in sequence, each individual primary-color test target so that light of each of a relatively "pure" color, red, green, and blue is directed at all of the different primary-color linear arrays at once (including or not including the "white" array, depending on a particular implementation). When light of a predetermined color is directed to all of the primary-color linear arrays, the response of each linear array (or individual pixel, i.e., the individual primary-color photosensors, such as shown in FIG. 3, that would "look at" effectively the same area in an image) is relevant to determining the extent of color crosstalk. For instance, looking at FIG. 3, if pure green light is directed at all the photosensors, of course a relatively large signal will be generated by the green photosensor 102G; but, for the various reasons mentioned above, green light will also cause small charges and resulting signals to be associated with neighboring photosensor 102R and 102B. Also, in some implementations, the green light falling on the white photosensor 102W will not only cause a signal in that photosensor but add charge, causing a signal, on 102R as well. By measuring the charges resulting from each of a series of predetermined color on all photosensors in a pixel, a color-correction factor for that pixel is obtained.

With regard to the flowchart of FIG. 4, taking a three-photosensor model (ignoring in this case the white photosensor) each photosensor is exposed to a different primary color, and a signal associated with that primary color input is measured for each photosensor, as shown at the steps indicated as 400. The results of the separate primary-color exposures are temporarily retained generally as "test data," and the test data is used to derive a cross-color correction factor, typically in the form of a matrix, as shown at step 402. The cross-color correction factor is subsequently used to modify, or used in conjunction with, the main look-up table with which the output signals from the apparatus are converted to a useable color space when an image is recorded, as shown as step 404.

In various possible embodiments, the data used to develop the cross-color correction factor is obtained during calibration steps (such as shown at 400 above) that occur at various times during the operation of the whole scanner, such as at power up or on a periodic basis. In contrast, the main look-up table such as used at step 404 is typically derived in a separate operation, typically with white light for all primary-color photosensors, as opposed to the separate primary color lights used in steps 400. The calibration steps for developing the main look-up table are performed separately from the calibration steps performed for cross-color correction, and may occur at the design or manufacturing phase of the scanner. In addition, there is a general calibration operation that is done for offset and gain, before step 400, to remove pixel-to-pixel dark nonuniformity and response nonuniformity, and also for balancing the color to color response; this calibration can also be done with a white light capture and a dark capture, and is usually done periodically in the scanner, at least as often as the cross-color correction captures of step 400.

In one embodiment, the derivation of a cross-color correction factor is preformed with every pixel (set of color photosensors) along an array. This is desirable because, at the level of precision in which cross-color factors are useful, precision of signals with regard to photosensors across an array are typically useful as well. Nonetheless, depending on a particular implementation, the calibration of cross-color factors can occur with a subset of pixels across the array, or be associated with contiguous blocks of pixels across the array. In cases where the array 100 comprises a plurality of abutted photosensor chips, it may be desirable to obtain a cross-color correction factor for each chip.

To take a practical example in detail:

For a pixel $$R_R = A_R I_R + B_R I_G + C_R I_B + \ldots D_R I_X \; R_G = A_G I_R + B_G I_G + C_G I_B + \ldots D_G I_X$$

$$R_B = A_B I_R + B_B I_G + C_B I_B + \ldots D_B I_X \; R_X = A_X I_R + B_X I_G + C_X I_B + \ldots D_X I_X$$

where $R_X$ is photosensor response in the X row (red, blue, or green), $I_X$ is the amount of X illumination bandwidth on any photosensor;

$A_X, B_X, C_X, D_X$ are the coefficients for each the photosensor in the X row; and $A_{XO}, B_{XO}, C_{XO}, D_{XO}$ are the average coefficients for all photosensors in the X row for all scanners.

For each pixel determine the difference in coefficients and correct the $R_X$ response for that photosensor.

$A_{X'}(1) = A_{XO} - A_X(1)$, and the same for $B_{X'}(1)$, $C_{X'}(1)$, $D_{X'}(1)$, etc.

Before global color correction, apply pixel by pixel delta correction:

$$R_{X'}(1) = A_{X'}(1) I_R + B_{X'}(1) I_G + C_{X'}(1) I_B + \ldots D_{X'}(1) I_X, \text{ and the same for } R_{G'}(1), R_{B'}(1), R_{R'}(1), \text{ etc.}$$

The global color correction is then applied to all pixels.

An alternative is that the color correction is used to personalize the global correction coefficients (such as a 3×3) for each pixel, in a similar way, perhaps with some weighting.

In addition, the equation of coefficients can be increased in length by the addition of higher order terms and cross-color components dependent on more than one cross-color illumination. Also, some terms could be dropped. For example:

$$R_R = A_R I_R + B_R I_G + C_R I_B + D_R I_G^2 + E_R I_B^2 + F_R I_B I_G, \text{ or any other combination.}$$

In a practical case of a three row sensor of order B, G, R the pixel by pixel correction is done on these simple equations, because the physical mixing in the silicon and color filter tail mixing is only between adjacent rows:

$$R_B = B_B I_G + C_B I_B \; R_G = A_G I_R + B_G I_G + C_G I_B \; R_R = A_R I_R + B_R I_G$$

In a practical case of a four row sensor of order B, G, R, W (with no second filter transmission humps outside of the primary region) the pixel by pixel correction could be done on these simple equations:

$$R_B = B_B I_G + C_B I_B \; R_G = A_G I_R + B_G I_G + C_G I_B$$

$$R_R = A_R I_R + B_R I_G + B_R I_W \; R_W = A_W I_R + B_W I_W$$

where $I_W$ for a tri-color illumination system is or might be the sum of $I_R + I_G + I_B$.

Although the described embodiment relates to primary colors in the visible spectrum, the teachings can be applied to calibration for recording other ranges of wavelengths of light, such as x-ray, ultraviolet, and/or infrared. Although the described embodiment relates to linear arrays of photosensors in a broader context of office equipment, the teachings can be applied to two-dimensional imaging apparatus such as digital still or video cameras. The teachings can be applied to CMOS, CCD, or other light-recording technology.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method of operating a photosensitive apparatus, the apparatus including a plurality of pixels, each pixel including a first photosensor sensitive to a first color and a second photosensor sensitive to a second color, wherein the first photosensor and the second photosensor are associated with a single pixel, wherein there are provided a plurality of pixels in the apparatus, comprising:

for each pixel, exposing the first photosensor and the second photosensor to light of substantially the first color, thereby deriving test signals from the first photosensor and the second photosensor;

for each pixel, exposing the first photosensor and the second photosensor to light of substantially the second color, thereby deriving test signals from the first photosensor and the second photosensor;

deriving from the test signals a cross-color correction factor for each pixel, the cross-color correction factor being related to migration of charge between the first photosensor and the second photosensor in the pixel;

using the cross-color correction factor for each pixel in processing signals output from the first photosensor and the second photosensor when an image is being recorded.

2. The method of claim 1, wherein the first photosensor and the second photosensor are defined in a single chip.

3. The method of claim 2, wherein the first photosensor and the second photosensor are in substantial proximity on the chip.

4. The method of claim 1, wherein there are provided a plurality of pixels in the apparatus, and the exposing is performed with substantially all of the plurality of pixels.

5. The method of claim 1, wherein the cross-color correction factor is expressible as a matrix.

6. The method of claim 1, further comprising
providing a first test area and a second test area within the apparatus, the first test area reflecting light of substantially the first predetermined color into the first photosensor and the second photosensor, and the second test area reflecting light of substantially the second predetermined color into the first photosensor and the second photosensor.

7. The method of claim 1, the using comprising
using the cross-color correction factor in combination with a main look-up table, the main look-up table relating to a response to white light.

8. A method of operating a photosensitive apparatus, the apparatus including a plurality of pixels, each pixel having associated therewith a first photosensor sensitive to a first color, a second photosensor sensitive to a second color, and a third photosensor sensitive to a third color, comprising, for each of a plurality of pixels:

for each pixel, exposing the first photosensor, the second photosensor, and the third photosensor to light of substantially the first color, thereby deriving test signals from the first photosensor, the second photosensor, and the third photosensor;

for each pixel, exposing the first photosensor, the second photosensor, and the third photosensor to light of substantially the second color, thereby deriving test signals from the first photosensor, the second photosensor, and the third photosensor;

for each pixel, exposing the first photosensor, the second photosensor, and the third photosensor to light of substantially the third color, thereby deriving test signals from the first photosensor, the second photosensor, and the third photosensor;

for each pixel, deriving from the test signals a cross-color correction factor for the pixel, the cross-color correction factor being related to migration of charge among the first photosensor, second photosensor and the third photosensor of the pixel; and using the cross-color correction factor in processing signals output from the pixel when an image is being recorded.

9. The method of claim 8, the method being applied to substantially all pixels associated with the apparatus.

10. The method of claim 8, wherein at least the first photosensor and the second photosensor for a pixel are defined in a single chip.

11. The method of claim 10, wherein at least the first photosensor and the second photosensor for a pixel are in substantial proximity on the chip.

12. The method of claim 8, further comprising
providing a first test area and a second test area within the apparatus, the first test area reflecting light of substantially the first predetermined color into the first photosensor and the second photosensor, and the second test area reflecting light of substantially the second predetermined color into the first photosensor and the second photosensor.

13. The method of claim 8, the using comprising
using the cross-color correction factor in combination with a main look-up table, the main look-up table relating to a response to white light.

* * * * *